May 12, 1936.  G. R. MAUPIN  2,040,440
MULTIPLE ROLLING TOOL
Filed July 5, 1934
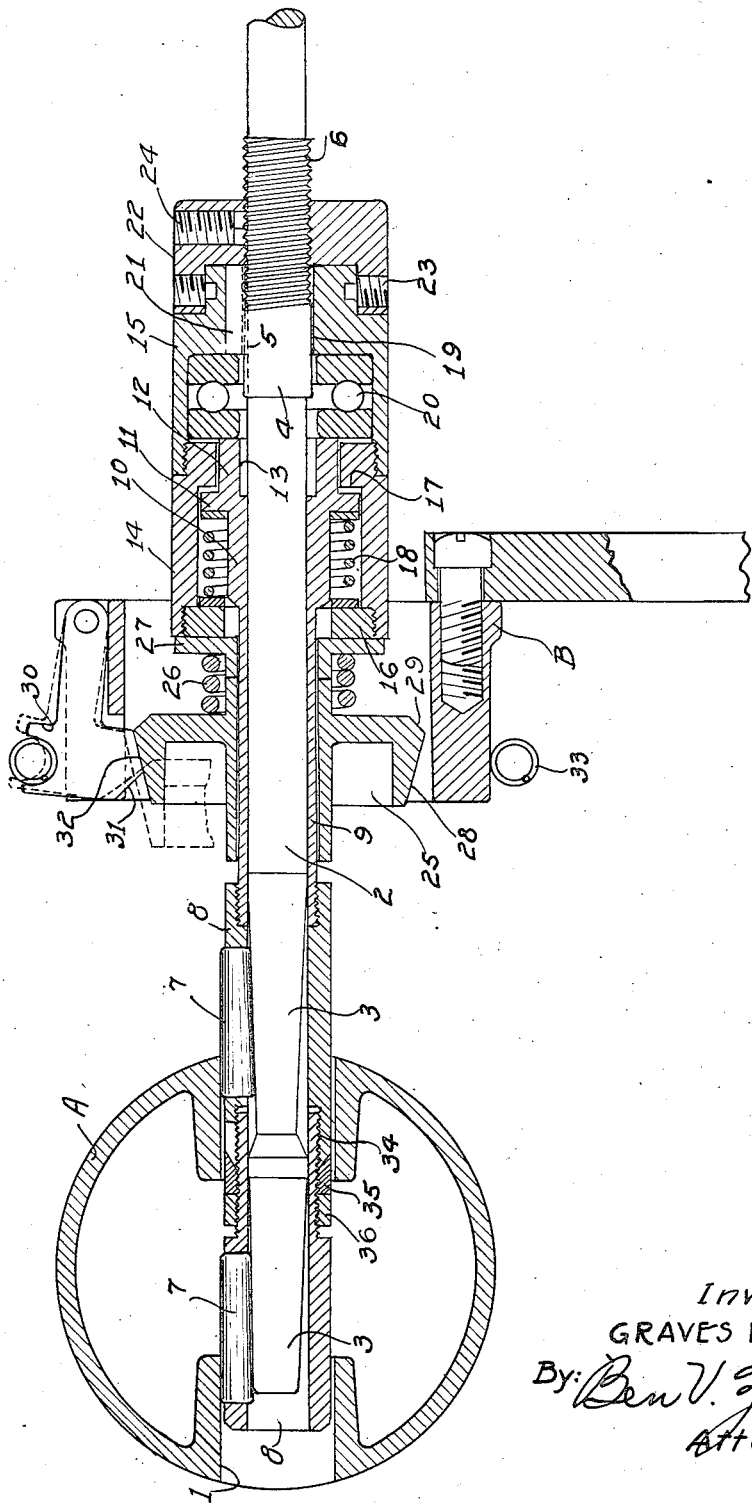
Inventor
GRAVES R. MAUPIN
By: Ben V. Zillman
Attorney Patented May 12, 1936

2,040,440

UNITED STATES PATENT OFFICE 2,040,440

MULTIPLE ROLLING TOOL

Graves R. Maupin, Moberly, Mo., assignor to The J. Faessler Mfg. Co., Moberly, Mo., a partnership composed of Christiana Faessler, Elizabeth Faessler, Louis E. Faessler, and Graves R. Maupin Application July 5, 1934, Serial No. 733,732

8 Claims. (Cl. 29—90)

The invention relates to tools for finishing cylindrical bearing surfaces, by rolling, and more especially to means for rolling a plurality of such surfaces, in alignment, simultaneously, so as to make the tool highly practical and advantageous for use in factory production, where precision must be coupled with speed and economy.

The invention has among its objects, the production of a tool of the kind described, which will be neat and simple in appearance and construction, as well as being simple in operation, be sturdy in design so as to perform its intended functions without losing any of its accuracy of operation, which can be quickly and readily operated so as to produce satisfactory and efficient service, and withal, will operate with the required degree of precision and economy.

Another object of my invention is to produce a multiple rolling tool adapted for rolling a plurality of cylindrical bearing surfaces in unison, and in which means are provided whereby the longitudinal spacing between adjacent rolling units may be adjusted quickly, simply, and accurately.

A further object of my invention is to provide a tool of the kind described, wherein means are included to substantially immediately collapse the rollers from their expanded to their contracted position at the end of the rolling operation, and whereby the rapidity of operation of the rolling is not hampered by any slow and cumbersome withdrawal of the rollers from the finished work.

A still further object of my invention is to provide means associated with the rolling tool, whereby resiliently compressible means are initially compressed at the commencement of the rolling operation, to cause a relative expansion of the rollers against the cylindrical bearing surfaces being operated on, said means being permitted to release at the end of rolling operation to quickly cause a relative contraction of the rollers and permit a correspondingly rapid withdrawal of the tool from said bearing surfaces.

Many other objects and advantages of the construction herein shown and described will be obvious to those skilled in the art to which this invention appertains, from the disclosures herein given.

To this end, my invention consists in the novel construction, arrangement, and combination of parts herein shown and described, and the uses mentioned, as will be more particularly pointed out in the claims.

In the drawing, wherein like reference characters indicate like or corresponding parts throughout the views, The figure is a longitudinal cross-sectional view through the tool, showing the manner of rolling a pair of aligned bearing apertures in a piece of work.

Referring more particularly to the drawing, wherein I have illustrated one of the preferred embodiments of my invention, A indicates a piece of work requiring the finishing of a plurality of aligned cylindrical bearing surfaces 1—1 therein, as for example the pair of wrist-pin holes of a piston. Unless these holes are in perfect alignment and of exactly equal diameter, its operation in service will be comparatively inefficient and will cause undue wear as well as troubles in assembly. Further, interchangeability of parts can not be had, unless too great a clearance of fit is permitted.

The ideal of fit in such machine parts is such that when a wrist pin of a given diameter is inserted through the pair of holes, in succession, such insertion may be done from either end of the piston selectively, without any perceptible deflection of the pin in its passage from one of said holes into the other, nor any halting or catching of any kind at the second hole entrance.

Such a fit has been relatively difficult to obtain, when using ordinary factory production methods, on account of prohibitive cost, but in the present invention, the tool for accomplishing this sort of a fit is intended primarily as a quantity production tool and therefore its action is speeded up at desired points of travel through the holes being finished.

A mandrel 2 is provided, having a plurality of like tapered portions 3—3 longitudinally therealong adjacent one another, there being but a pair of such tapered portions in the embodiment shown, inasmuch as this specific tool is intended for finishing wrist pin bearings or bushings. A shouldered enlargement 4 is provided at the rear end of the mandrel, and a longitudinally extending slot or keyway 5 is provided rearwardly therefrom. A threaded portion 6 is interposed on the mandrel between the extreme rear end and the shouldered portion, said extreme rear end of the mandrel being adapted to be power driven in any suitable manner, not shown.

A cage 8 is provided for each of the bearing surfaces to be rolled in the work, and therefore but two such cages are indicated in the embodiment shown, each of such cages having a set of rollers 7 positioned therein and so arranged that said rollers may be actuated bodily either radially inwardly or outwardly of the cage in the course of operation of the device. These rollers are arranged in the radial openings through said cages, as shown, and the rollers are preferably arranged at a slight angle to the longitudinal axis of the cage, to cause the rollers to self-feed through the bearings being rolled, in the manner shown in my prior Patent 1,619,479 of March 1, 1927, said rollers being so proportioned that they will have their taper to roll smoothly on the similarly tapered portions of the mandrel.

A sleeve 9 is preferably detachably connected to the plurality of cages so as to carry both and actuate the same, said sleeve having a radially enlarged portion 10 adjacent the rear end of the same, with an integral collar projecting radially therebeyond at 11, and another enlargement 12 extending rearwardly of said collar. The bore of the sleeve is enlarged at its rear end 13 to receive the shouldered portion 4 of the mandrel.

Obviously, as the mandrel is shifted longitudinally to the left, relatively to the cages, the rollers will be actuated radially outwardly, and as the mandrel is shifted in the reverse direction, the rollers will drop to their contracted positions.

A thrust bearing means is arranged between the mandrel and the sleeve, as the mating sections 14 and 15, the former having an inwardly extending removable flange 16 at its forward end, and another inwardly extending flange 17 at its rear end, and between which flanges the radial enlargement 11 may move longitudinally, the enlarged portion 10 of the sleeve passing through the first flange 16, while the enlargement 12 may pass through the second flange, 17. A spring 18 may be interposed between the flange 11 and the flange 16, to normally keep the parts in the position shown, this spring being relatively light.

The mating section 15 is provided with an inwardly flanged portion 19 between which and the flange 17 of the first section, there may be arranged a ball thrust bearing or other anti-friction element 20, there being a key 21 between the flange 19 and the key-way in the mandrel, so that sliding movement of the mandrel and the sections 14 and 15, relatively to one another is provided, but relative rotational movement therebetween is prevented when said key is in place in the key-way.

A micrometer adjustment for small and accurate adjustments of feed or expansion limits of the rollers, may be provided by the collar 22 rotatably secured to the section 15 by means of the set screws 23 in the annular groove of said section, one of said cooperating elements, as for example the element 15 having a mark inscribed thereon at the rear edge, and the element 22 having a series of annularly spaced equidistant markings thereon to successively register with said mark and whereby a predetermined movement of the mandrel forwardly or rearwardly of the sleeve may be had. A set screw 24 may be used to hold the element 22 fixed to the mandrel when desired.

A clutch element 25 is arranged freely rotatable on the sleeve intermediate the section 14 and the cages, said element having its hub extending forwardly and rearwardly thereon and of slightly less length than the distance between the rear end of the cages and the section 14, or the collar 27 interposed between said section 14 and element 25. A spring 26, or other suitably resilient element, is interposed between the rear end of the clutch and the collar 27, to normally urge said clutch forwardly on the sleeve into engagement with the cages, said spring being of relatively greater strength than the spring 18. The element 25 is preferably provided with a conically shaped periphery 28, extending from its forward face to adjacent the rear, and an oppositely tapered conical periphery 29 from the rear face to intersect the first conical surface, to thereby make a substantially V-shaped peripheral surface on said clutch.

One or more pawls or dogs 30 may be arranged in the path of movement of the clutch 25, said dogs each having one friction face 31 to engage with the conical face 28 of the clutch, and with a second friction face 32 to engage with the rear face 29 of the clutch. The dogs are pivotally secured to a fixed element B, so as to be movable to and from said clutch axis, and in order to maintain the dogs in frictional contact with the clutch, a coil spring 33 may be positioned to encircle the same to exert its pressure simultaneously on all of said dogs.

The drawing illustrates the position of the various parts of the device just as the rolling of the holes is begun, and the operation to that point is substantially as follows:

Assuming that the piston is in place ready for final rolling and smoothing of the pin holes and that the device is in position for such servicing, then the clutch will be substantially in the dotted line position shown, with the forward end of its hub portion abutting the rear edge of the rear cage 8, and with the spring 26 in its extended form. While the clutch is in such position the parts 14—15—22 and the mandrel will be moved to the right relatively of the sleeve 9 inasmuch as the pressure of said main spring is sufficiently strong to accomplish such relative shifting against the pressure of the lighter spring 18, the latter being then in compressed position. With the parts in such relative positions, the spring 26 presses the clutch forwardly against the rear of the rearward cage and the free or rear end of the portion 12 of the sleeve will accordingly be spaced from the adjacent thrust bearing 20.

Now, as the tool is shifted forwardly toward the piston the forward face 28 of the clutch will be engaged by the rear faces 32 of the dogs. The dogs are in turn pressed radially inwardly toward the clutch by the encircling spring 33, and the resultant frictional engagement between said dogs and clutch will be sufficient to temporarily arrest further forward movement of the clutch and results in the main spring 26 being compressed to the form shown, the spring 18 being opened and exerting its pressure against the shoulder 11 of the sleeve and moving the latter in turn to the position shown in the drawing, so that said sleeve and the cages carried therewith are shifted to such position that the rollers are initially radially expanded to the predetermined degree for proper engagement with the pin openings through the piston.

Thus, the required rolling pressure is rapidly established and the rotation of the mandrel, preferably by power means serves to carry the entire tool forwardly inasmuch as the rollers are self-feeding due to their angular relationship to the axis of the cages.

This feeding continues until the end of the rolling operation, and at which predetermined time the ridge of the clutch element will pass the ridge of the dogs, as shown in the dotted line position of said two cooperating elements, and at which time the pressure of the encircling spring 33 will augment the pressure of the spring 26 to force the clutch forwardly, first alone and then together with the sleeve, thereby shifting the cages forwardly relatively of the mandrel, and which of course causes said rollers to drop inwardly of their slots and permits of the rapid backing out of the tool from the finished holes. As the tool movement proceeds rearwardly, the dogs hold the clutch forwardly to maintain said rollers in their contracted position until the latter are clear of their respective holes in the piston, and continued rear movement results in the dogs snapping past said ridge of the clutch to again initially expand the rollers. By this time the next piston to be operated on is in place ready for engagement with the rollers.

In order to insure that the pair of holes will be rolled to the same size in the event that one set of rollers or the mandrel is incorrectly sized, as by becoming worn or the like, I have provided independent adjustments to provide these compensations, and have accordingly so arranged the adjacent cages that they are in longitudinally adjustable engagement, as for example, by providing them with telescoping threaded parts as at 34. Means may be provided to lock them together in such adjusted relationships, as by a clamping ring 35 secured in threaded engagement on the one adjacent cage and having a beveled end to encircle a split correspondingly beveled end of said cage, and a lock nut for tightening up against said first ring, as at 36.

Having thus described my invention, it is obvious that various immaterial modifications may be made in the same without departing from the spirit of my invention; hence I do not wish to be understood as limiting myself to the exact form, arrangement, construction, and combination of parts herein shown and described, or the uses mentioned, except as limited by the state of the art to which this invention appertains, and the claims hereunto appended.

What I claim as new and desire to secure by Letters Patent is:

1. In a device of the kind described and in combination, a tapered mandrel; work-engaging means on said mandrel radially expansible to roll a bored surface; and means to initially move said last-mentioned means relatively to said mandrel to radially expand the work-engaging means into work-engagement, and allow more rapidly retracting the same at the completion of said work.

2. In a device of the kind described and in combination, a tapered mandrel; radially actuated work-engaging rollers thereon movable longitudinally thereof; and resiliently actuated means operable to rapidly actuate said rollers longitudinally relatively to said mandrel after a predetermined amount of longitudinal travel of said rollers.

3. In a device of the kind described and in combination, a tapered mandrel; a sleeve thereon and having work-engaging rollers carried thereby; thrust-bearing means between said sleeve and mandrel; a resiliently actuated clutch rotatable on said sleeve but having a limited longitudinal movement thereon to actuate said bearing relatively to said sleeve; and means frictionally engageable with said clutch to hold the same from such resilient actuation.

4. In a device for finishing a cylindrical surface, a sleeve; a tapered mandrel movable longitudinally therethrough; a cage carried by said sleeve and having work-engaging rollers operably engageable with said mandrel; a rotary clutch having a limited longitudinal movement on said sleeve; means frictionally engageable with said clutch to move it relatively of said sleeve in one direction of said longitudinal movement at substantially the beginning of work-engagement by said rollers; and means for resiliently opposing said movement and operative to actuate said clutch and sleeve in the reverse direction at the end of said work engagement.

5. In a device for rolling a cylindrical surface to finish the same and comprising a mandrel having a tapered end; a sleeve movable longitudinally thereon and having work-engaging rollers cooperating with the tapered end of said mandrel; a thrust bearing between said mandrel and sleeve; a spring between said sleeve and thrust bearing to maintain a predetermined pressure; a rotatively mounted clutch having a limited longitudinal movement on said sleeve; a second spring, stronger than the first, between said thrust bearing and clutch to normally urge the latter in one direction on said sleeve; and means for engagement with said clutch for only a predetermined travel of said sleeve to hold said stronger spring from said actuation of said clutch during said predetermined travel.

6. In a device of the kind described and in combination, a sleeve having work-engaging rollers carried thereby; a tapered mandrel movable longitudinally through said sleeve and cooperable with said rollers to expand them into work-engagement; a clutch rotatable on said sleeve and having a limited longitudinal movement on said sleeve; a spring normally urging said clutch to the limit of its sliding movement in one direction; and means cooperable with said clutch for a predetermined longitudinal movement of the same to overcome the pressure of said spring and releasable thereafter to cause rapid retraction of said rollers, comprising dogs mounted on a relatively fixed element and frictionally engaging said clutch.

7. In a device for rolling a cylindrical surface, a sleeve having work-engaging rollers carried thereby; a tapered mandrel movable longitudinally through said sleeve and engageable with said rollers to expand the same into work-engagement; and means for engaging said work in a predetermined manner and comprising a clutch on said sleeve so as to be freely rotatable and have a limited slidable movement, a spring between said clutch and mandrel to normally urge the former forwardly of the latter, said clutch having a conical surface, and dogs fixed to a stationary element and having a double conical surface frictionally engageable with said conical surface of said clutch and whereby the engagement between said clutch and one conical face of the dogs will shift the clutch rearwardly against the spring pressure, until the clutch moves longitudinally a predetermined distance and the other conical face of the dogs will assist the action of said spring to throw the clutch forwardly to actuate the sleeve relatively of the mandrel and thereby retract said rollers rapidly.

8. In a device of the kind described and in combination, a tapered mandrel; a sleeve thereon and having work-engaging rollers; a thrust-bearing on said mandrel; a clutch rotatable on said sleeve and having a limited longitudinal movement on the same; resilient means between said sleeve and bearing to hold them frictionally engaged; a second resilient means between said clutch and bearing and of sufficient strength to overcome the action of said first resilient means and move said sleeve out of said frictional engagement with the bearing; and means engageable with said clutch to temporarily overcome the action of the second resilient means and permit said first resilient means to function.

GRAVES R. MAUPIN.